United States Patent
Baldassarre et al.

(10) Patent No.: US 11,144,314 B2
(45) Date of Patent: Oct. 12, 2021

(54) SYSTEMS AND METHODS FOR SOFTWARE DOCUMENTATION AND CODE GENERATION MANAGEMENT

(71) Applicant: Accenture Global Solutions Limited, Dublin (IE)

(72) Inventors: Emanuele Baldassarre, Bari (IT); Luigi Lucca, Rome (IT); Davide Di Perna, Rome (IT); Ettore Carpinella, Casalbore (IT); Giuseppe Melfa, Naples (IT)

(73) Assignee: Accenture Global Solutions Limited, Dublin (IE)

( * ) Notice: Subject to any disclaimer, the term of this patent is extended or adjusted under 35 U.S.C. 154(b) by 79 days.

(21) Appl. No.: 16/746,459

(22) Filed: Jan. 17, 2020

(65) Prior Publication Data

US 2021/0224062 A1 Jul. 22, 2021

(51) Int. Cl.
*G06F 8/73* (2018.01)
*G06F 8/33* (2018.01)
*G06F 9/54* (2006.01)

(52) U.S. Cl.
CPC .............. *G06F 8/73* (2013.01); *G06F 8/33* (2013.01); *G06F 9/54* (2013.01)

(58) Field of Classification Search
CPC .............. G06F 8/33; G06F 8/73; G06F 9/54
USPC ........................................................ 717/123
See application file for complete search history.

(56) References Cited

U.S. PATENT DOCUMENTS

| | | | |
|---|---|---|---|
| 8,141,031 B2 | 3/2012 | Iborra et al. | |
| 8,370,798 B2 | 2/2013 | Broadfoot et al. | |
| 8,806,440 B2 | 8/2014 | Janson | |
| 8,819,629 B2 | 8/2014 | Sherrill | |
| 9,043,759 B1 | 5/2015 | Lininger | |
| 10,509,642 B2* | 12/2019 | Li et al. | G06F 8/658 |
| 2004/0148612 A1 | 7/2004 | Olsen | |
| 2018/0314622 A1* | 11/2018 | Lowe et al. | G06F 9/44526 |
| 2020/0218634 A1* | 7/2020 | Jones et al. | G06F 8/33 |

(Continued)

OTHER PUBLICATIONS

Yunhe Mu et al., "Extracting Software Functional Requirements From Free Text Documents", published in 2009 International Conference on Information and Multimedia Technology; Dec. 16-18, 2009; Jeju Island, South Korea.

(Continued)

*Primary Examiner* — Wei Y Zhen
*Assistant Examiner* — Mohammed N Huda
(74) *Attorney, Agent, or Firm* — Plumsea Law Group, LLC (57) ABSTRACT

The present disclosure relates to systems, methods, and computer readable medium for automatically managing API documentation and code generation. The disclosure provides an IDE plug-in that may import a machine readable reference documentation file from a documentation database, and create automatically generated code from the machine readable reference documentation file. Generally, the IDE plug-in may then allow a developer to validate their project back against the machine readable reference documentation file to ensure that all expected code is present in the project. This may allow the developer to ensure that the project properly meets the functional objectives intended for the API, before their implementation is deployed.

20 Claims, 8 Drawing Sheets

(56) References Cited

U.S. PATENT DOCUMENTS

2020/0226002 A1* 7/2020 MacLeod .................. G06F 8/73

OTHER PUBLICATIONS

Barrett R. Bryant et al., "From Natural Language Requirements to Executable Models of Software Components", published in Workshop on Software Engineering for edded Systems [2003]: From Requirements to Implementation.
IBM: "Patterns: Model-Driven Development Using IBM Rational Software Architect", Internet Citation, Dec. 6, 2005, XP007904115; Retrieved from http://www.redbooks.ibm.com/abstracts/sg247105.html.

* cited by examiner

```
 CreateOrUpdateUser.java
1  package com.accenture.cpaas.dcpp.enabler.acm.ac.services.api;
2
3  import javax.ws.rs.Consumes;
...
18 /**This interface define all APIs with the basepath equal to <p> /ac/device-provisioning */
19 @Api(value = "/ac/user-provisioning", description = "CRUD for create or update user")
20 public interface CreateOrUpdateUser {
21
22   @PUT
23   @Consumes({MediaType.APPLICATION_JSON})
24   @Produces({MediaType.APPLICATION_JSON})
25   @ApiOperation(value = "This API allows to put a create or update user provisioning.")
26   @ApiResponses(value = {
27     @ApiResponse(code = 204, message = "No Content", response = DeviceAssignmentProvisioningResponse.class),
28     @ApiResponse(code = 500, message = "Generic Error", response = DeviceAssignmentProvisioningResponse.class),
29     @ApiResponse(code = 400, message = "Bad Request", response = DeviceAssignmentProvisioningResponse.class),
30     @ApiResponse(code = 404, message = "Not Found", response = DeviceAssignmentProvisioningResponse.class),
31     @ApiResponse(code = 409, message = "Conflict", response = DeviceAssignmentProvisioningResponse.class)
32   })
33   @Path("")
34   DeviceAssignmentProvisioningResponse createOrUpdateUser(
35     CreateOrUpdateUserRequest createOrUpdateUserRequest,
36     @HeaderParam(AcmAcApiConstants.CPAAS_TENANT_ID) String tenantId,
37     @HeaderParam(AcmAcApiConstants.CPAAS_TRANSACTION_ID) String transactionId,
38     @HeaderParam(AcmAcApiConstants.CPAAS_PARENT_BUSINESS_USER_ID) String parentBusinessUserId,
39     @HeaderParam(AcmAcApiConstants.CPAAS_USER_ID) String callerUserId,
40     @HeaderParam(AcmAcApiConstants.CPAAS_VISIBILITY_GRANT_ID) String visibilityGrantId
41   );
42 }
```

SYSTEMS AND METHODS FOR SOFTWARE DOCUMENTATION AND CODE GENERATION MANAGEMENT

TECHNICAL FIELD

The present disclosure generally relates to the management of documentation and code generation in the development of a computer software program. More specifically, the present disclosure generally relates to automated systems and methods for ensuring that programming code developed to implement a desired computer software matches the documentation written to describe the desired features of the software. Even more specifically, the present disclosure generally relates to generating an application programing interface (API) from the documentation used to describe the API in such a way as to minimize common potential development problems.

BACKGROUND

An application programming interface (API) is an electronic communication protocol between two computing devices, that allows a client computing device to make a request to a server computing device and receive a response back. APIs are commonly used in a wide range of computing applications—serving as the architecture for many aspects of the world wide web, smartphone apps, and also private internal systems used by various businesses. APIs are often used to allow third parties to access some data or function performed by the server. In order for the API to do this, the API should have sufficient documentation that describes what inputs the client should send to the server.

When creating a new API, generally organizations may either (1) write the code first, and then generate the documentation from the code; or (2) write the documentation first, and then create the code based on the documentation. The latter "design first" approach is more commonly used in large organizations developing complex APIs. Generally, a functional analyst creates an interface agreement document that describes how to use the API, what its responses will be to various inputs, in a natural language document such as a word processor document. Then, developers may create the API programming code based on the documentation.

However, in large organizations that create and use complex APIs, different developer teams may work from the same documentation yet nonetheless create different implementations using different code based on different interpretations and understandings of the underlying documentation. As a result, the API publish and test phases may become extremely expensive, with repeated time-consuming communications between the functional analyst and the developers. The API may therefore be deployed with less than ideal, albeit passable, code.

There is a need in the art for a systems and methods that addresses the shortcomings discussed above.

SUMMARY

This disclosure provides systems and methods for creating an API by managing API documentation, automatically translating documentation into code, and validating the code against the documentation before deployment. In this way, the workflow of both the functional analyst who creates the documentation and the developer who implements the code is simplified. Additionally, the provided systems and methods ensure that the developer's work product consistent with documentation created by the functional analysts. The provided systems and methods also improve the functioning of one or more computing devices by ensuring proper annotations are present within the code, and ensuring proper full unit testing.

In one aspect, this disclosure provides a system for generating program code for an application programming interface, the system comprising at least one computing device, the computing device including a processor; and wherein the computing device is configured to perform the steps of: (1) receiving a reference documentation file, the reference documentation file describing one or more classes of variables; (2) generating project files, the project files including automatically generated code, the automatically generated code including annotations and class skeletons for each of the one or more classes of variables described in the reference documentation file; (3) allowing a developer user to add additional code to the project files, the additional code including one or more methods, and one or more unit tests; (4) generating a project documentation file based on the project files; (5) validating the project files to ensure the project files, as including the automatically generated code and the additional code added by the developer user, are consistent with the reference documentation file; (6) receiving an error report, describing any differences between the project documentation file and the reference documentation file, and displaying the error report to the developer user; and (7) allowing the developer user to publish the project files as an application programming interface upon successful validation.

In another aspect, this disclosure provides a method of generating an application programming interface, the method comprising: (1) providing a developer user access to an integrated development environment program that includes a plug-in; (2) accessing an API repository database with the plug-in; (3) receiving a reference documentation file from the API repository database with the plug-in, the reference documentation file describing one or more classes of variables; (4) generating project files in the integrated development environment program with the plug-in, the project files including automatically generated code, the automatically generated code including annotations and class skeletons for each of the one or more classes of variables described in the reference documentation file; (5) allowing the developer user to add additional code to the project files; (6) generating a project documentation file based on the project files; (7) receiving the reference documentation file from the API repository database into a back-end server, and receiving the project documentation file into the back-end server; (8) comparing the reference documentation file to the project documentation file with the back-end server; (9) generating an error report, describing any differences between the project documentation file and the reference documentation file, using the back-end server; and (10) displaying the error report to the developer user with the plug-in.

In yet another aspect, the disclosure provides a non-transitory computer-readable medium storing software comprising instructions executable by one or more computers which, upon such execution, cause the one or more computers to: (1) provide to a developer user an integrated development environment program that includes a plug-in, on a first computing device; (2) access an API repository database on a second computing device with the plug-in, the API repository database including a plurality of reference documentation files; (3) communicate a list of one or more of the plurality of reference documentation files in the API repository database from the second computing device to the first computing device; (4) receive into the plug-in on the first computing device a selected reference documentation file from the second computing device, as selected by the developer user from the list of one or more of the plurality of reference documentation files, the selected reference documentation file describing one or more classes of variables; (5) generate project files in the integrated development environment program with the plug-in, the project files including automatically generated code, the automatically generated code including annotations and class skeletons for each of the one or more classes of variables described in the selected reference documentation file; (6) allow a developer user to add additional code to the project files; (7) generate a project documentation file based on the project files; (8) send the project documentation file from the first computing device to a third computing device; (9) communicate the selected reference documentation file from the second computing device to the third computing device; (10) comparing the project documentation file to the selected reference documentation file, and generating an error report that describes any differences between the project documentation file and the reference documentation file, on the third computing device; and (11) sending the error report from the third computing device to the plug-in on the first computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a screenshot showing code automatically generated by a system or method in accordance with this disclosure;

DESCRIPTION OF EMBODIMENTS

Generally, this disclosure provides systems and methods for generating program code for an application programming interface (API). The code may be generated through a combination of automatically converting certain documentation and also manual code written by a developer. The code may be validated against the documentation prior to deployment. In this way, the system or method ensures that the final written code accords with the functional design. The API may therefore be developed in an efficient manner, with appropriate unit testing, and deployed with accurate documentation.

Figure 1:
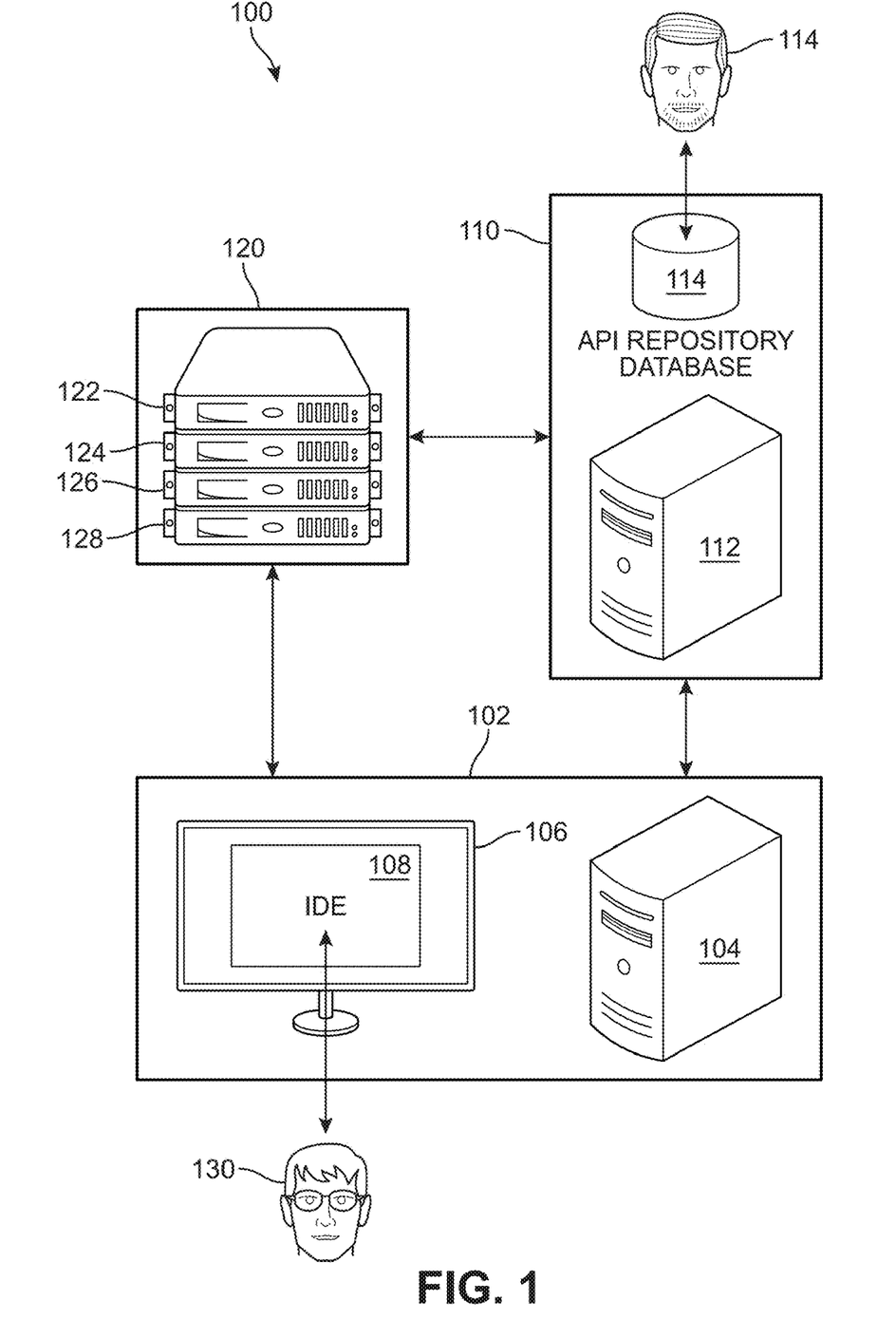
FIG. 1 is a schematic diagram of an embodiment of a system that includes multiple pieces of hardware in according with this disclosure.

FIG. 1 shows an embodiment of a system 100 in accordance with this disclosure. Generally, a system 100 for generating program code for an application programming interface may comprise at least one computing device, where the computing devices include a processor and are configured to perform the steps as described herein below. The specific system 100 shown in FIG. 1 may be comprised of three separate computing resources, including first computing resource 102, second computing resource 110, and third computing resource 120. First computing resource 102 may include computing device 104 and display device 106. Developer user 130 may interact with first computing resource 102. Computing device 104 may be configured to run an integrated development environment (IDE) program.

An IDE program, as is generally known, is a software application that provides one or more tools to developers 130 for software development. IDEs commonly include tools such a source code editor, tools for automatic generation of codes, a debugger, a complier, and others. Common IDEs known in the art include Eclipse, NetBeans, SharpDevelop, and Lazarus.

Next, system 100 may include second computing resource 110. Second computing resource 110 may include computing device 112 that includes an API repository database 114. API repository database 114 is described in greater detail below, but generally may be any type of database that is capable of storing API documentation and (in some embodiments) API application files. Functional analyst user 114 may interact with second computing resource 110, for example by adding API documentation to API repository database 114.

Third computing resource 120 may also be present in system 100. Third computing resource 120 may include one or more computing devices 122-128. In the particular embodiment shown, third computing resource 120 includes first server 122, second server 124, third server 126, and fourth server 128. However, in general, third computing resource may be referred to as including one or more servers that interact with both first computing resource 102 (including IDE 108) and that also interact with second computing resource 110 (including API repository database 114).

Reference is made above to various computing resources (e.g., 102, 110, 120) and computing devices (e.g. 104, 112, and 122-128). It should be understood that such computing resources and/or devices could comprise hardware components (e.g. physical servers) or virtualized cloud computing components provided as part of a cloud computing environment. For example, computing devices 122-128 of third computing resource 120 could comprise one or more compute instances, storage instances, and/or the like.

Figure 2:
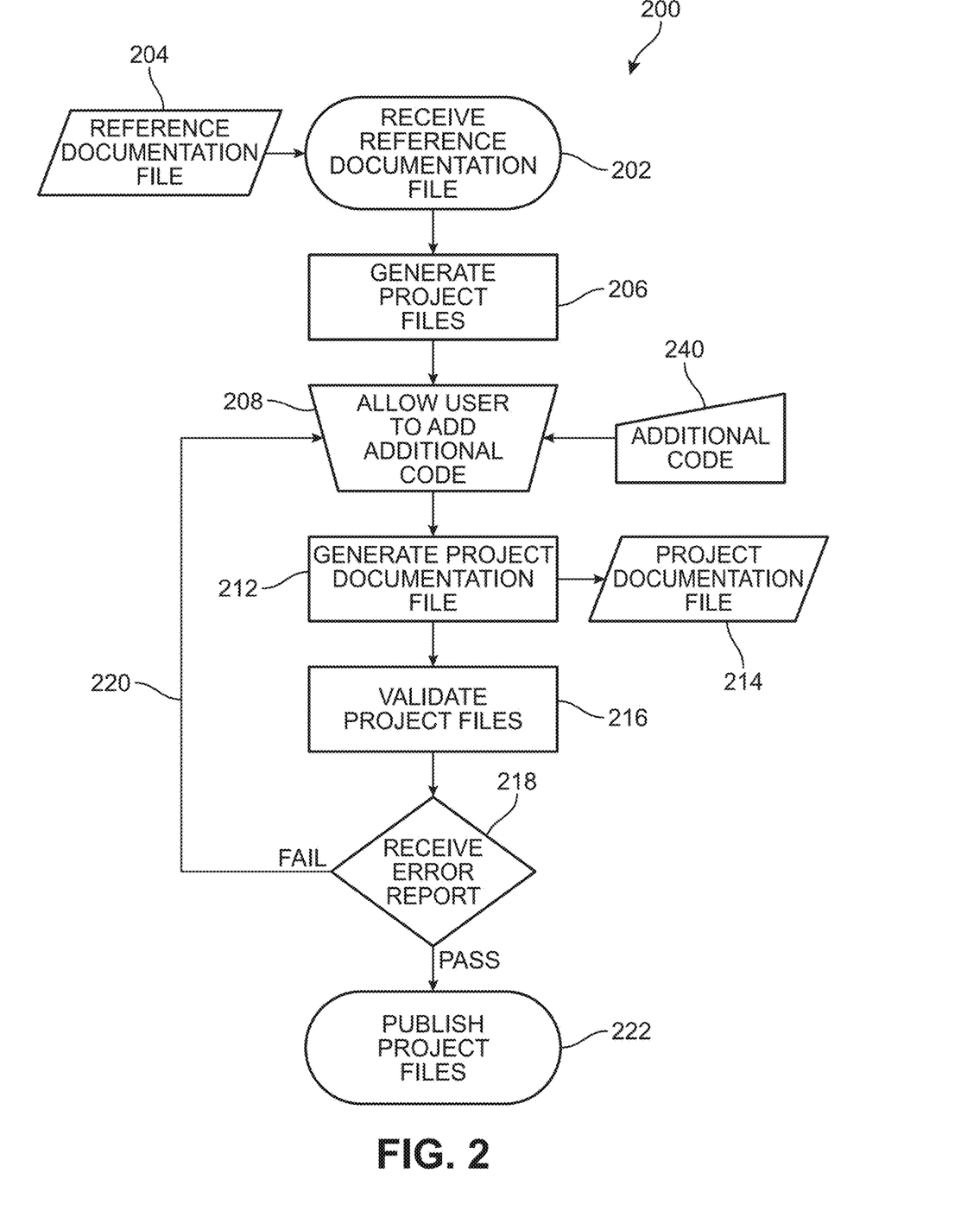
FIG. 2 is a flowchart showing a first process in accordance with this disclosure performed by one or more computing devices.

FIG. 2 shows a flowchart of a process 200 that may be performed by system 100. Specifically, process 200 may be performed by first computing resource 102. In initial step 202, process 200 begins by receiving a reference documentation file 204. A reference documentation file may be a machine readable file that describes the parameters of an API in a structured, standardized format. Most broadly, the reference documentation file may describe one or more classes of variables.

In more particular embodiments, a reference documentation file 204 may be a file that is formatted in accordance with the OpenAPI specification. The OpenAPI specification is an API descriptor format for RESTful APIs, that allows description of an entire API including endpoints, operations on each endpoint, operation parameters including input and output for each operation, authentication methods, contact information, licensing information, terms of use, and other general information about the API. An example of an OpenAPI specification file that is formatted in accordance with the OpenAPI specification is a swagger file. OpenAPI specification files may be written in YAML or JSON formats. In one embodiment, the reference documentation file 204 may be a JSON swagger file that is formatted in accordance with the OpenAPI 3.0 standard. In other embodiments, the reference documentation file 204 may be formatted in accordance with the OpenAPI 2.0 standard, an older version which is sometimes referred to as "the swagger standard". In yet other embodiments, the reference documentation may be formatted in accordance with any other standard.

Next, in step 206, process 200 may generate project files. Project files may be any set of files that, once compiled and deployed on a server, may function as an API. In particular embodiments, IDE 108 may generate the project files on computing device 104. Project files may be created in the IDE 108 using any commonly known programming language capable of creating APIs. For example, the project files may be created in Java, PHP, Python, Ruby, .NET, Perl, or others as may be known in the art. In a particular embodiment, the project files may be generated in the Java programming language.

The project files created at step 206 of process 200 may include automatically generated code that is based on the reference documentation file 204, as received at step 202. Specifically, the project files may include automatically generated code annotations and class skeletons for each of the one or more classes or variables described in reference documentation file 204. As is known in the art, code annotations are non-executable code that may be used to provide supplemental information about one or more aspects of the associated code. For example, an annotation may add a special attribute to the variable, method, class, interface, or other language elements. Annotations are only metadata, and do not contain any business logic.

A class skeleton, as is generally known in the art of computer programming, is an outline of a class that contains a description of the class' roles and describes the purposes of the variables and methods—but does not implement them. The class may then later be implemented, with business logic as desired by the developer, from the class skeleton.

The developer may do just that at step 208. Namely, step 208 may include allowing a user to add additional code 240 to the project files. Broadly, step 208 may include any manual coding done by the developer user 130—and may also include any additional coding added using other tools that automatically generate other code (other than the automatically generated code specified above). As is known in the art, many IDEs include a variety of tools for automating routine coding tasks that may aid in developing the business logic.

In particular embodiments, at step 208 the developer user may add additional code that includes one or more methods, and one or more unit tests. Unit tests, as is known, are used to test individual code components and ensure that code works the way it was intended. Commonly, a testing framework like JUnit or TestNG may be used by the developer to generate unit tests within an IDE. Test cases are typically written at a method level and executed via automation. In some embodiments, the JUnit testing framework may be used by the developer user to add test suites that aggregate multiple unit test cases from multiple classes in one place and run them together.

In a particular embodiment, a system or method in accordance with this disclosure may create class skeletons for each of the one or more classes of variables described in the reference documentation file in the project files, and also automatically create the JUnit test skeletons for each of the one or more classes of variables. By creating the JUnit test skeletons in this way, the system or method may ensure complete unit test coverage. With both types of skeletons being automatically generated, the developer only needs to replace the input parameters to invoke the API. Accordingly, the system or method significantly speeds up testing on all APIs created in accordance with this disclosure.

Next at step 212, process 200 may generate a project documentation file 214. Project documentation file may be based on the project files, as including the automatically generated code based on the reference documentation file 204 and the additional code 240 added by the developer at step 208. Project documentation file 214 may be an OpenAPI "swagger" file that describes the project files according to the OpenAPI 3.0 (or 2.0) specification standard. In one particular embodiment, the project documentation file 214 may be a JSON file that is formatted in accordance with the OpenAPI 3.0 standard.

Process 200 may next include validating the project files at step 216. Specifically, in embodiments, step 216 may include validating the project files to ensure that the project files, as including the automatically generated code and the additional code 240 added by the developer 130, are consistent with the reference documentation file. Validating the project files in this way may ensure that the reference documentation is properly followed, the correct outputs map to the correct inputs, while still allowing the developer 130 to code the business logic of the methods according to best practices and the developer's preferences.

As a result of the validation in step 216, process 200 may next include receiving an error report at step 218. The error report may describe any differences between the project documentation file and the reference documentation file. The validation 216 therefore may use the project documentation file 214 to carry out a comparison with the original reference documentation file 204 received at step 202. Step 218 may also include displaying the error report to the developer user 130 such as by using display 106 shown in FIG. 1. In this way, the developer 130 can be advised in real time about what is missing from the project files and correct any mistakes before committing the API code to the repository.

Namely, if the validation fails 220 for any reason because an expected set of code based on the reference documentation file 204 is not present in the project files as described by the project documentation file 214, then the developer may go back to step 208 to add additional code to fix the omission described in the error report. On the other hand, if the validation passes and no errors are described in the error report, then process 200 may proceed to step 222 of publishing the project files. Namely, the developer 130 may be allowed to publish the project files as an API upon successful validation. Thus, deployment of the API may be blocked until successfully validating against the reference documentation file.

Accordingly, process 200 may be carried out by one or more computing devices such as computing device 104, in order to improve the quality of the final API product by reducing the number of iterations and the cost to arrive at the final result.

Figure 3:
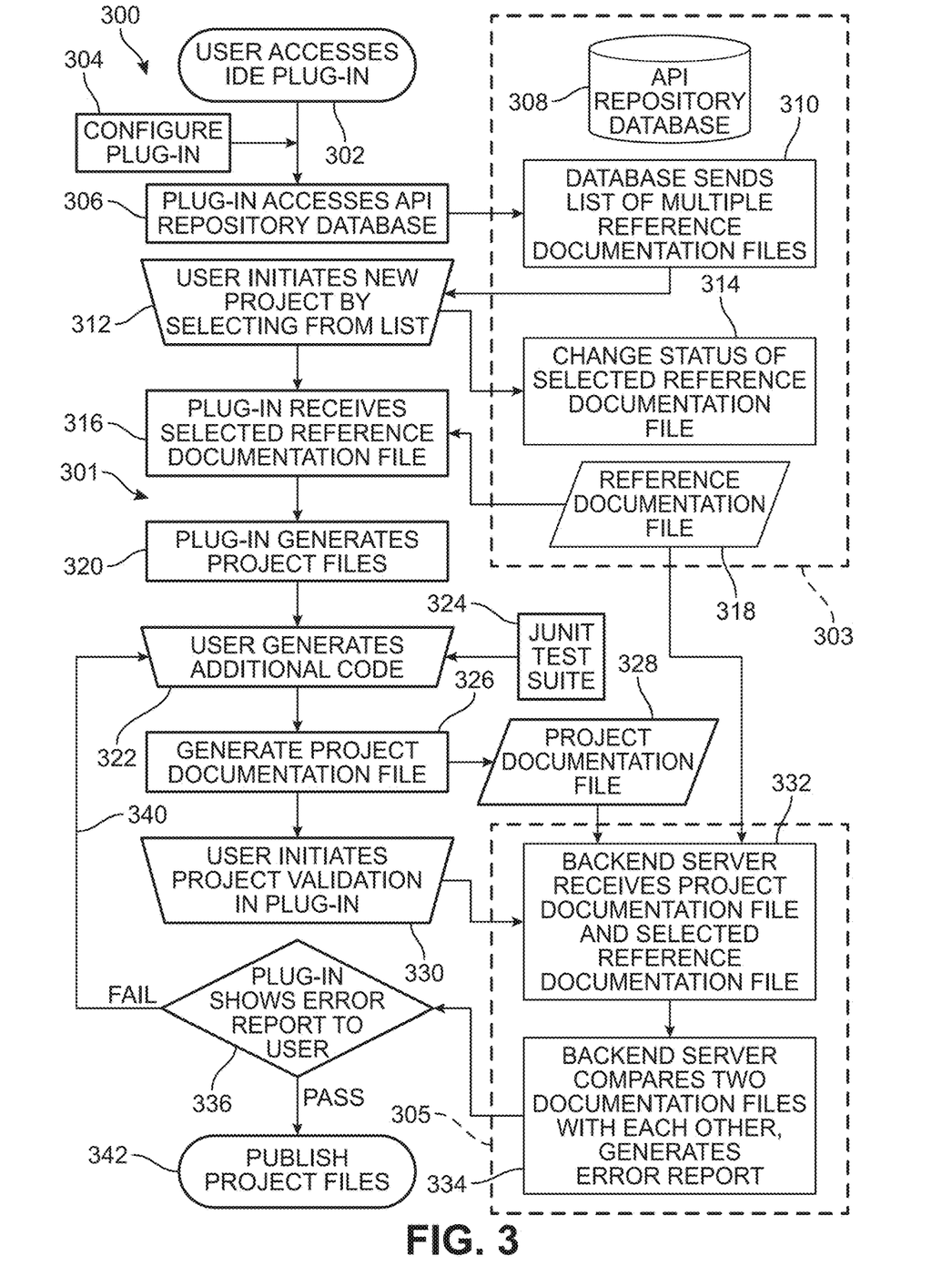
FIG. 3 is a flowchart showing a second process in accordance with this disclosure performed by several computing devices.

FIG. 3 shows another process 300 in accordance with this disclosure. Process 300 shows further detail about several of the steps discussed above with respect to process 200, and also shows how several computing resources (102, 110, 120 and 310, 303, 305) may communicate with each other and perform various tasks in order to arrive at a well coded API.

Process 300 may start at step 302 with a user accessing an IDE 108 that includes a plug-in. The plug-in within the IDE may perform several of the steps performed by first computing resource 102 (as shown at 301 in FIG. 3). In an initial setup step, the user may configure the plug-in at step 304. Configuring the plug-in may include directing the plug-in to a certain URI associated with second computing resource 110/303 that includes API repository database 308. Other configuration steps that may be included in step 304 may include entering one or more user settings associated with the ability to access a subset of a plurality of reference documentation files included in the API repository database 308.

Next, at step 306 plug-in 301 may access the API repository database 308 by being in electronic communication with second computing resource 110. In response, second computing resource 110 may send a list of multiple reference documentation files to the plug-in 301 at step 310. In this embodiment, API repository database may include a plurality of reference documentation files—where each of the plurality of reference documentation files are associated with a different API project. Step 310 may therefore include communicating a list of one or more of the plurality of reference documentation files from second computing resource 303 to plug-in 301 on first computing resource 102. The list may include all of the plurality of different reference documentation files, or some subset thereof—such as certain reference documentation files that a certain developer is authorized to access based on the user settings entered at step 304.

In response, at step 312 the developer user may initiate a new project by selecting one reference documentation file from the list of multiple reference documentation files. The selection may be communicated back to API repository database 308, and then plug-in 301 therefore next receives the selected reference documentation file 318 from the API repository database 308 at step 316.

API Repository database 308 may also change a status of the selected reference documentation file 318 at step 314. Namely, in some embodiments, API repository database 308 may include metadata associated with each of the plurality of reference documentation files therein. This metadata may include features allowing for management of each reference documentation file. For example, API repository database 308 may be configured to be accessed by multiple developer users—and therefore may include features related to tracking which developers are working on projects using which reference documentation files. Specifically, in certain embodiments, the plug-in 301 may send to the API repository database status data indicating that the reference documentation file is currently in use when the plug-in 310 receives the reference documentation file from the API repository database 308, and the API repository database 308 may block other developers from accessing that reference documentation file when the status metadata indicates that it is in use. In this way, step 314

Other metadata that may be included in the API repository database for each of the plurality of reference documentation files therein may include development status data, version data, availability status data, and permissions data. Development status data may describe whether the reference documentation file is ready to be implemented into an API by a developer. Version data may describe whether the reference documentation file has been updated, such as by a functional analyst who may have changed one or more parameters in the reference documentation file. Availability status may describe whether the reference documentation file is currently in use by any developer and may therefore be blocked from use by other developers. Finally, permissions data may describe which out of a plurality of developers may access the reference documentation file.

Process 300 next may include step 320 wherein the plug-in 301 generates the project files. Step 320 may be similar to step 206 in process 200 as described above. Namely, the plug-in 301 in IDE 108 may generate the project files which will function as the API when compiled. Process 300 may then proceed to step 322 of allowing the developer user to generate additional code and add it to the project files. In the specific embodiment shown in FIG. 3, step 322 may be done partially by the use of JUnit 324 to create one or more unit test suites. Step 326 next may include the plug-in 301 automatically generating a project documentation file 328. Step 326 may be similar to step 212 in process 200 as described above.

Once the developer user has finished adding all additional code they believe may be necessary to the project, the developer user may initiate validation of the project by selecting an option within the plug-in 301 at step 330.

Initiating the validation of the project at step 330 may cause a back-end server 305 (which may be a computing device associated with third computing resource 120) to receive the reference documentation file 318 and the project documentation file 328 at step 332. Back-end server may be used in certain embodiments in order to compute business logic that would otherwise be overly taxing to first computing resource 102.

Back-end server 305 may therefore engage in the comparison of the reference documentation file 318 to the project documentation file 328 at step 334. Back-end server 305 may also generate the error report also at step 334, that describes any differences between the project documentation file 328 and the reference documentation file 318.

At step 336, the plug-in 301 may receive the error report from the back-end server 305 and display the error report to the developer user. As discussed above, the error report may allow the developer to verify that the final implemented code is consistent with the original reference documentation. If the error report includes one or more errors, the validation may be considered to fail 340 and the developer user may return to step 322 to generate further additional code to resolve the error(s). On the other hand, if the error report indicates that there are no differences, then the validation passes. Upon passing the validation, the project files maybe published or otherwise deployed at step 342. In some embodiments, the project files may be published to the API repository database 308.

As a result of process 300, the several computing resources (301, 303, 305) work together to allow the developer to verify that the code in their project matches the documentation describing that project. This verification may therefore ensure better coding, more efficient project management and development, and better coded APIs.

Figure 4:
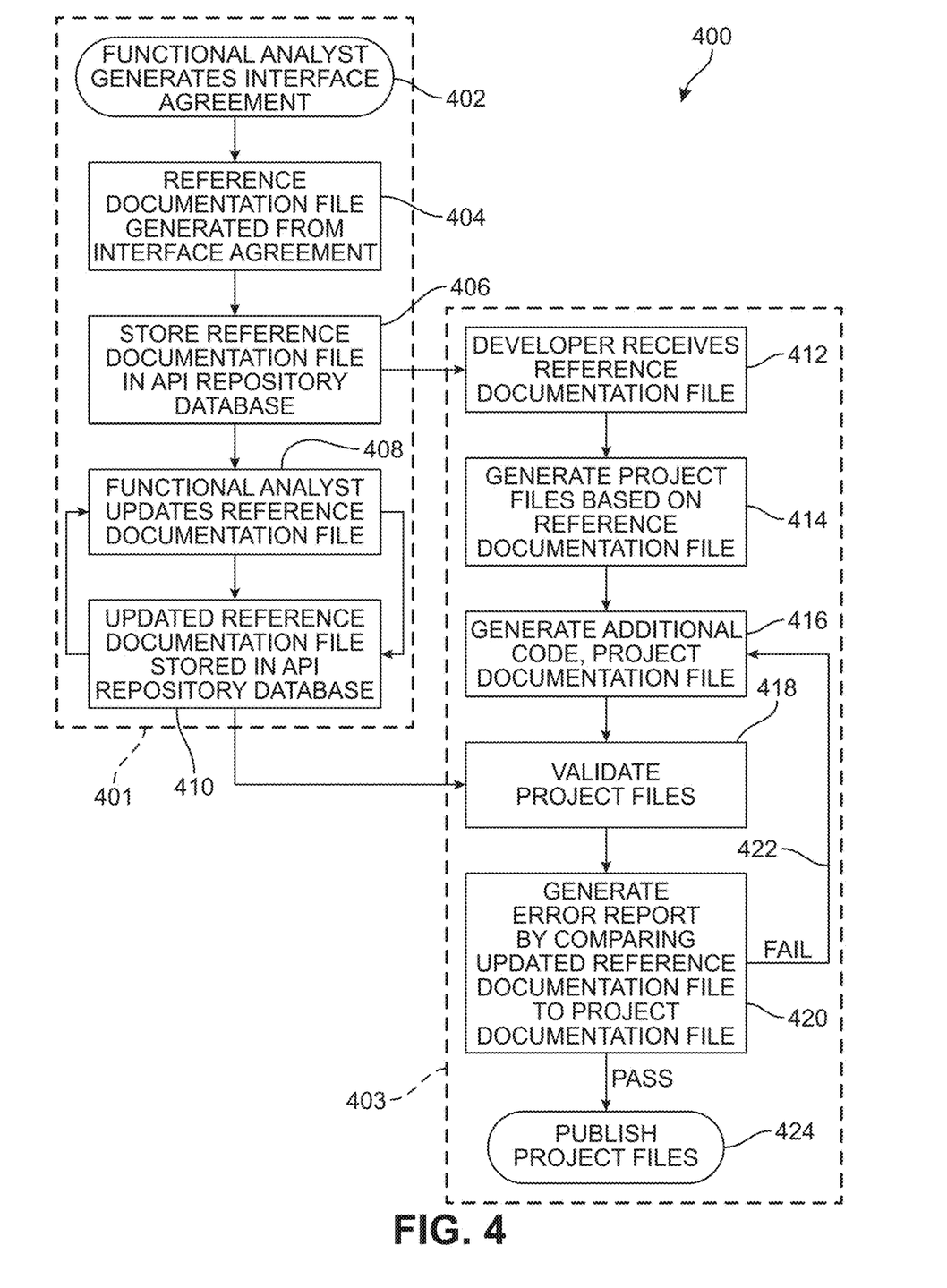
FIG. 4 is a flowchart showing interactions between two types of users, as they use a system in accordance with this disclosure.

FIG. 4 shows a flowchart of how a functional analyst 114 may work in parallel with a developer 130, and how the system or method in accordance with an embodiment of this disclosure interacts with each of them.

Namely, in process 400 a functional analyst may first generate an interface agreement. As mentioned above, an interface agreement may be a natural language document (such as a word processor document) that describes how to use the API, and what its responses will be to various inputs. The parameters of the API, including one or more classes of variables, are described in the interface agreement in otherwise unstructured natural language.

The initial documentation of the interface agreement may then be converted into a reference documentation file, such as a reference documentation file structured in the OpenAPI 3.0 specification standard. Specifically, at step 404 a reference documentation file may be generated from the interface agreement—such as by analyzing the interface agreement using one or more of natural language programming and meta-data extraction.

In one embodiment, a user may create an interface agreement by creating a new reference documentation file in the OpenAPI 3.0 standard from scratch. The user may then fill in mandatory and optional fields to add additional data to the new reference documentation file—such fields may include general description, input parameter, output parameter, I/O example, and custom additional paragraph among others. Once the user generates these fields, the user may save the file to the API repository database 114 using second computing resource 110. When saved, the process 400 may generate the reference documentation file that contains the interface agreement directly inside the same file, in a description field.

Next, at step 406 of process 400 the reference documentation file may be stored in the API repository database.

Subsequently, in the particular embodiment shown in FIG. 4, the functional analyst may update the reference documentation file with one or more changes to the parameters describing the API therein at step 408. The updated reference documentation file may then be stored in the API repository database, in place of the original reference documentation file, at step 410. Version data metadata mentioned above may be updated to reflect the update to the reference documentation file. In this way, steps 402, 404, 406, 408, 410 may take place from the perspective of the functional analyst.

In conjunction, the developer's perspective 403 may include the developer receiving the reference documentation file at step 412. Step 412 may be substantially similar to step 202 in process 200 or step 316 in process 300, as discussed above. Also as discussed above, first computing resource 403 may generate project files based on the reference documentation file at step 414, and then allow the developer to create additional code and then automatically generate the project documentation file at combined step 416.

In the embodiment shown in FIG. 4, however, when first computing resource goes to validate the project files it receives the updated reference documentation file instead of the original reference documentation file at step 418. This may occur when an update to the reference documentation file occurs after the developer has already initiated the project based on the original reference documentation file. In the absence of a system or method in accordance with this disclosure, such a scenario may cause undue confusion, costs, and delays.

However, as shown in FIG. 4, a system or method in accordance with this disclosure will check for any update to the reference documentation file upon validation. This will ensure that the code is always up to date with any changes to the reference documentation. In this way, the functional analyst's perspective 401 and the developer's perspective 403 remain integrated in an automated way, without investing additional labor and time in communications between them explaining any update to the reference documentation file.

Namely, at step 420 process 400 will generate an error report by comparing the updated reference documentation file to the project documentation file. If the validation returns one or more errors, then it is considered to fail, and the developer may return to step 416 to generate additional code in the project files to correct the error. Loop 422 may occur as many times as necessary until no errors are returned. Additionally, the functional analyst may repeat steps 408 and 410 as many times as necessary. In this way, the system or method in accordance with this disclosure ensures that the developer may verify in real time if the annotations in the code are correct and correspond to the ones expected by the continually updated documentation.

When no errors are returned by the validation, the project files may be published at step 424.

Accordingly, FIG. 4 shows how the system or method ensures that the final written code accords with the functional design regardless of any update to the functional design described in the reference documentation file. The API may therefore be developed in an efficient manner, with appropriate unit testing, and deployed with accurate documentation and without bugs.

Figure 5:
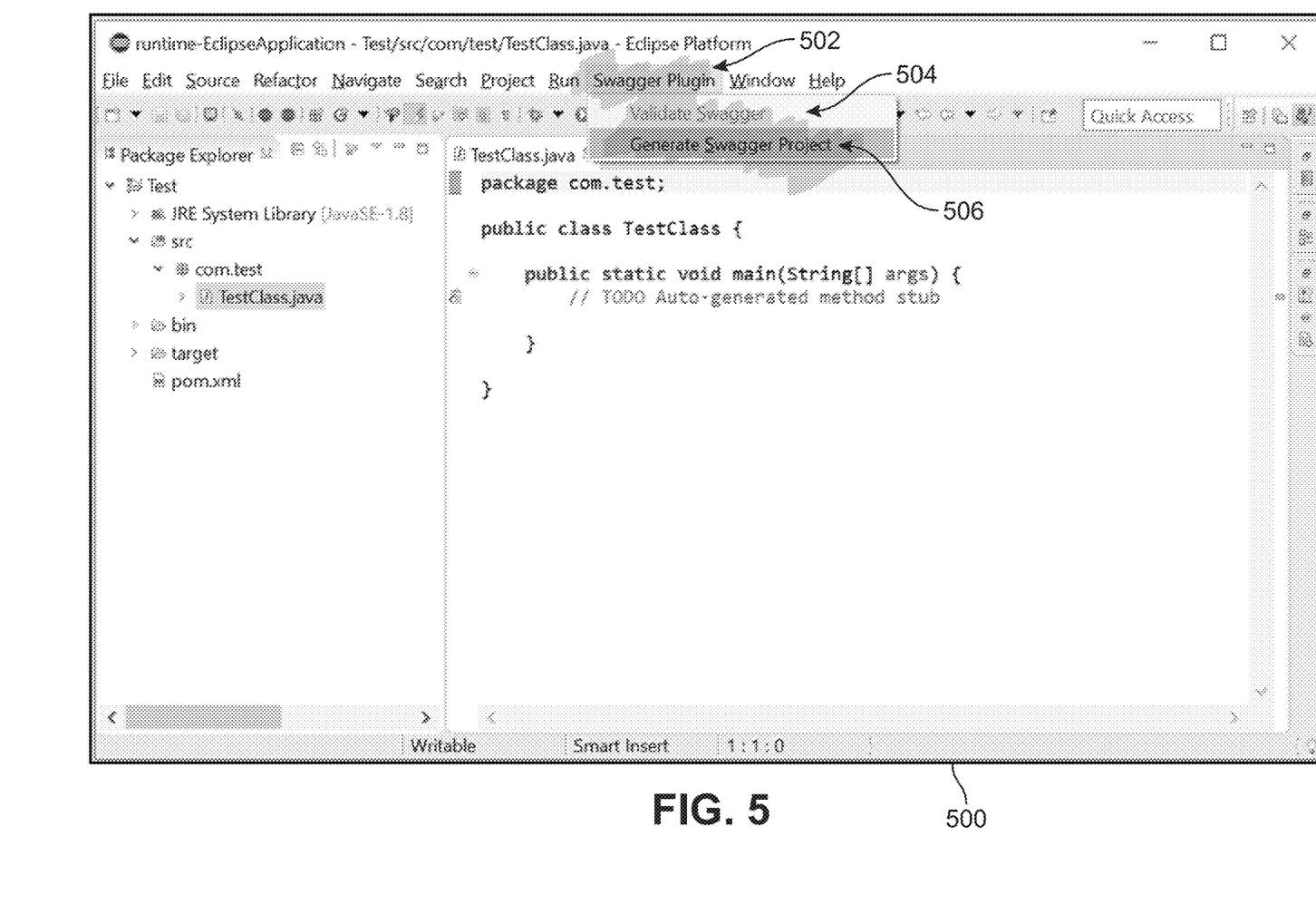
FIG. 5 is a screenshot showing an integrated development environment program that includes a plug-in in accordance with this disclosure.

FIG. 5 shows a screenshot of an IDE 500 with a plug-in 502 in accordance with an embodiment. Plug-in 502 may include a first option 504 to validate swagger and a second option 506 to generate swagger project. Second option 506 to generate swagger project may initiate step 306 of process 300 as shown in FIG. 3.

FIG. 6 shows a screenshot of automatically generated code created by a system or method in accordance with an embodiment. Code 600 may be included in a project file created at step 320 of process 300 as shown in FIG. 3. Specifically, FIG. 6 shows automatically generate code annotations that may be automatically generated based on the one or more classes described in the reference documentation file. For example, annotations 602 and 604 may describe the purpose of the API. Other annotation such as 606, 608, 610, 612, 614, 616 may describe the several outputs the API should generate in response to certain input values.

Figure 7:
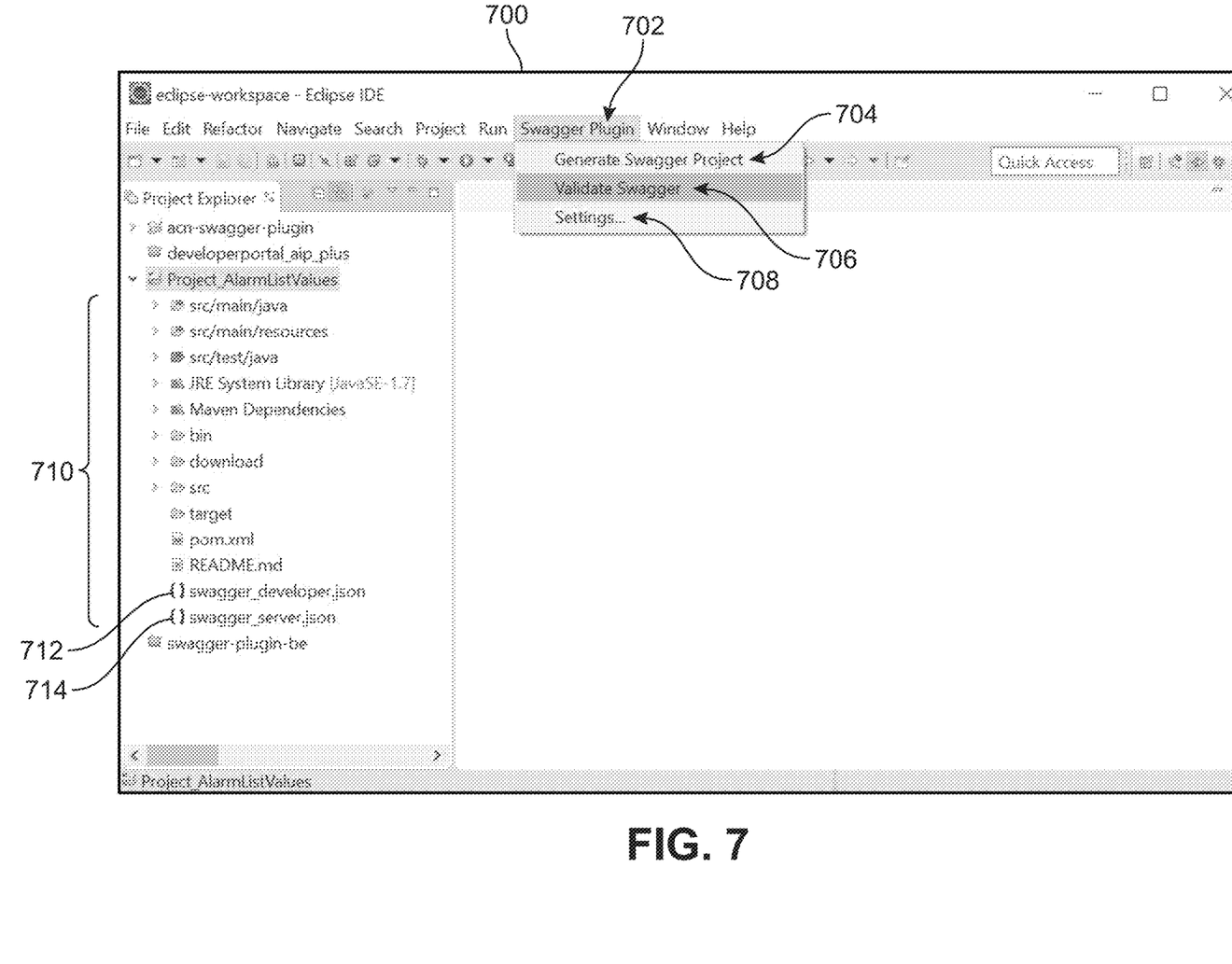
FIG. 7 is a screenshot showing an integrated development environment program that includes the plug-in in accordance with this disclosure.

FIG. 7 shows an IDE 700 with project files 710. The project files as shown in FIG. 7 may be fully developed project files, including both automatically generated code as shown in FIG. 6 and also developer added code. Also shown are the project documentation file 712 and the reference documentation file 714.

The developer may then use the plug-in 702 to validate the project files against the reference documentation by selecting validate swagger 706. This may correspond to step 330 in process 300 as shown in FIG. 3. FIG. 7 also shows plug-in settings option 708. Plug-in settings option 708 may allow the developer to configure the plug-in, as discussed above.

Figure 8:
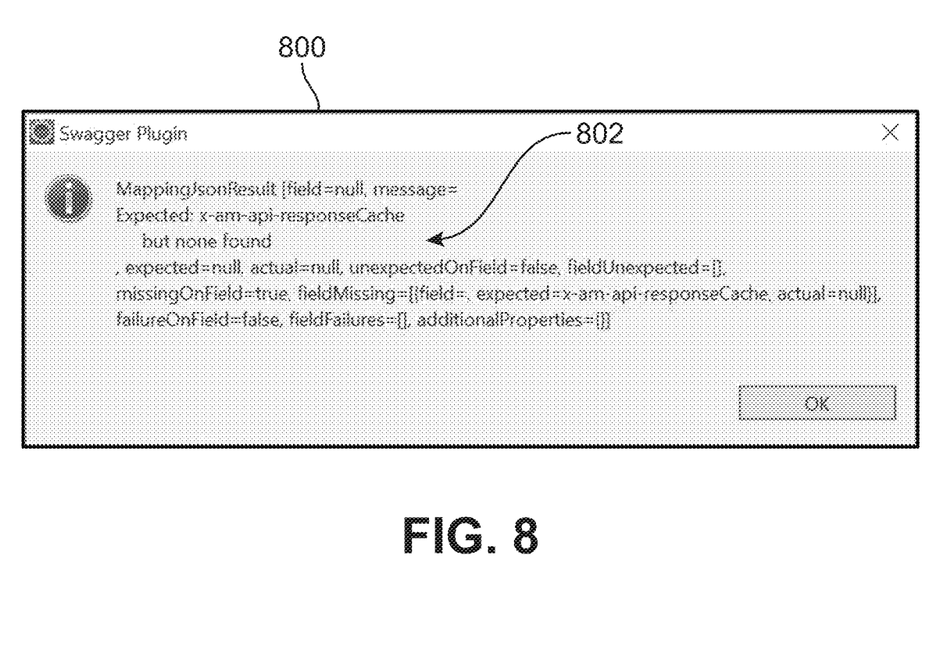
FIG. 8 is a screenshot showing an error message generated by a system or method in accordance with this disclosure.

Finally, FIG. 8 shows an error message 800 generated by the plug-in and displayed in the IDE to the developer. This may correspond to step 336 in process 300 as shown in FIG. 3. Error message 800 may identified the expected code 802 that is missing from the project files.

Accordingly, as a result of the above disclosed systems and methods, an application programming interface may be created in an efficient and systemic manner that avoids miscommunications, misunderstandings, and potential bugs. By allowing the functional analyst and the developer to work together seamlessly, large organizations may create, develop, and deploy complex APIs with fewer obstacles and better more efficient code.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for generating program code for an application programming interface, the system comprising at least a first computing device, the first computing device including a processor, and wherein the first computing device is configured to perform the steps of:
receiving an interface agreement describing how an application programming interface will operate, the interface agreement having been written by a functional analyst human being user in unstructured natural language;
generating a reference documentation file based on the received interface agreement, the reference documentation file describing one or more classes of variables;
generating project files based on the generated reference documentation file, the project files including automatically generated code, the automatically generated code including annotations and class skeletons for each of the one or more classes of variables described in the reference documentation file;
allowing a developer user to add additional code to the project files before the project files are published as an application programming interface, the additional code including one or more methods, and one or more unit tests;
generating a project documentation file based on the project files;
validating the project files to ensure the project files, as including the automatically generated code and the additional code added by the developer user, are consistent with the reference documentation file generated from the interface agreement written by the functional analyst human being user;
receiving an error report, describing any differences between the project documentation file and the reference documentation file, and displaying the error report to the developer user; and
allowing the developer user to publish the project files as an application programming interface upon successful validation.

2. The system of claim 1, wherein:
the system comprises a second computing device, the first computing device and the second computing device being in electronic communication with each other;
the first computing device is configured to host an application programming interface repository database, the application programing interface repository database including a plurality of reference documentation files;
the first computing device is configured to communicate to the second computing device a list of one or more of the plurality of reference documentation files; and
the second computing device receives a selected reference documentation file from the first computing device, as selected by the developer user from the list of one or more of the plurality of reference documentation files.

3. The system of claim 2, wherein:
the system further includes a third computing device;
the step of validating the project files includes sending the project documentation file to the third computing device;
the third computing device is configured to validate the project files by comparing the project documentation file to the reference documentation file;
the third computing device generates the error report; and
the first computing device receives the error report from the third computing device.

4. The system of claim 1, wherein:
the first computing device is configured to run an integrated development environment program;
the integrated development environment program includes a plug-in; and
the plug-in within the integrated development environment program receives the reference documentation file, generates the project files, receives the error report, and displays the error report.

5. The system of claim 1, wherein the system is further configured to:
analyze the interface agreement using at least one of natural language programming and metadata extraction to generate the reference documentation file.

6. The system of claim 1, wherein:
the reference documentation file is a JavaScript Object Notation swagger file that is formatted in accordance with the OpenAPI 3.0 standard.

7. The system of claim 1, wherein:
the system further includes a third computing device in electronic communication with the first computing device;
the third computing device receives an updated reference documentation file, the updated reference documentation file corresponding to the reference documentation file as changed in one or more ways by a functional analyst user;
wherein the step of validating the project files includes the third computing device comparing the project documentation file to the updated reference documentation file;
and wherein the step of receiving an error report includes the first computing device receiving the error report from the third computing device, the error report describing any differences between the project documentation file and the updated reference documentation file.

8. A method of generating an application programming interface, the method comprising:
providing a developer user access to an integrated development environment program that includes a plug-in;
accessing an application programing interface repository database with the plug-in;
receiving a reference documentation file from the application programming interface repository database with the plug-in, the reference documentation file describing one or more classes of variables, the reference documentation file having been generated from an interface agreement that describes how an application programming interface will operate, the interface agreement having been written by a functional analyst human being user in unstructured natural language;
generating project files in the integrated development environment program with the plug-in based on the received reference documentation file, the project files including automatically generated code, the automatically generated code including annotations and class skeletons for each of the one or more classes of variables described in the reference documentation file;
allowing the developer user to add additional code to the project files before the project files are published as an application programming interface;
generating a project documentation file based on the project files;
at a back-end server:
comparing the reference documentation file generated from the interface agreement written by the functional analyst human being user to the project documentation file; and
generating an error report, describing any differences between the project documentation file and the reference documentation file; and
displaying the error report to the developer user with the plug-in.

9. The method of claim 8, wherein the method further includes steps of:
analyzing the interface agreement using at least one of natural language programming and metadata extraction to generate the reference documentation file.

10. The method of claim 8, wherein:
the application programming interface repository database includes a plurality of reference documentation files; and
the method further includes a step of configuring the plug-in with one or more user settings associated with the ability to access a subset of the plurality of reference documentation files included in the application programming interface repository database.

11. The method of claim 8, wherein:
the application programming interface repository database includes a plurality of reference documentation files, and the application programming interface repository database is configured to be accessed by multiple developer users;
the plug-in sends to the application programming interface repository database status data indicating that the reference documentation file is currently in use when the plug-in receives the reference documentation file from the application programming interface repository database; and
the application programming interface repository database blocks other developer users from accessing the reference documentation file when the reference documentation file is in use.

12. The method of claim 8, wherein:
the application programming interface repository database is updated with an updated reference documentation file, the updated reference documentation file corresponding to the reference documentation file as changed in one or more ways; and
at the back-end server:
receiving the updated reference documentation file from the application programming interface repository database;
comparing the updated reference documentation file to the project documentation file; and
generating the error report describing any differences between the project documentation file and the updated reference documentation file.

13. The method of claim 8, wherein:
the reference documentation file is a JavaScript Object Notation swagger file that is formatted in accordance with the OpenAPI 3.0 standard; and
the project documentation file is a JavaScript Object Notation swagger file that is formatted in accordance with the OpenAPI 3.0 standard.

14. The method of claim 8, wherein:
when the error report includes no differences between the project documentation file and the reference documentation file, allowing the developer user to publish the project files as an application programming interface via the plug-in.

15. A non-transitory computer-readable medium storing software comprising instructions executable by one or more computers which, upon such execution, cause the one or more computers to:
provide to a developer user an integrated development environment program that includes a plug-in, on a first computing device;
access an application programming interface repository database on a second computing device with the plug-in, the application programming interface repository database including a plurality of reference documentation files, each of the plurality of reference documentation files having been generated from an interface agreement that describes how an application programming interface will operate, the interface agreement having been written by a functional analyst human being user in unstructured natural language;
communicate a list of one or more of the plurality of reference documentation files in the application programming interface repository database from the second computing device to the first computing device;
receive into the plug-in on the first computing device a selected reference documentation file from the second computing device, as selected by the developer user from the list of one or more of the plurality of reference documentation files, the selected reference documentation file describing one or more classes of variables;
generate project files in the integrated development environment program with the plug-in based on the selected reference documentation file, the project files including automatically generated code, the automatically generated code including annotations and class skeletons for each of the one or more classes of variables described in the selected reference documentation file;
allow a developer user to add additional code to the project files before the project files are published as an application programming interface;
generate a project documentation file based on the project files;
send the project documentation file from the first computing device to a third computing device;
communicate the selected reference documentation file from the second computing device to the third computing device;
compare the project documentation file to the selected reference documentation file generated from the interface agreement written by the functional analyst human being user, and generate an error report that describes any differences between the project documentation file and the reference documentation file, on the third computing device; and
send the error report from the third computing device to the plug-in on the first computing device.

16. The non-transitory computer-readable medium of claim 15, wherein:
each of the plurality of reference documentation files in the application programming interface repository database is formatted in accordance with one of the OpenAPI 2.0 standard and the OpenAPI 3.0 standard.

17. The non-transitory computer-readable medium of claim 15, wherein:
the plug-in allows the developer user to publish the project files to the application programming interface repository database on the second computing device when the error report shows no differences between the project documentation file and the selected reference documentation file.

18. The non-transitory computer-readable medium of claim 15, wherein one or more of the computing devices:
analyzes the interface agreement using at least one of natural language programming and metadata extraction to generate the reference documentation file; and
stores the generated reference documentation file in the application programming interface repository database on the second computing device.

19. The non-transitory computer-readable medium of claim 15, wherein:
the plug-in allows the developer user to add additional code to the project files includes adding unit testing for each class in a test suite with a JUnit test framework within the integrated development environment program.

20. The non-transitory computer-readable medium of claim 15, wherein the application programming interface repository database on the second computing device includes, for each of the plurality of reference documentation files therein:
development status data describing whether the reference documentation file is ready to be implemented into an application programming interface;
availability status data describing whether the reference documentation file is currently being used by any developer; and
permissions data describing which of a plurality of developers may access the reference documentation file.

* * * * *